H. M. LIESE.
DEVICE FOR MEASURING AND FOR REGULATING THE FLOW OF FLUIDS—LIQUID OR GASEOUS.
APPLICATION FILED DEC. 8, 1911.
1,177,193.  Patented Mar. 28, 1916.
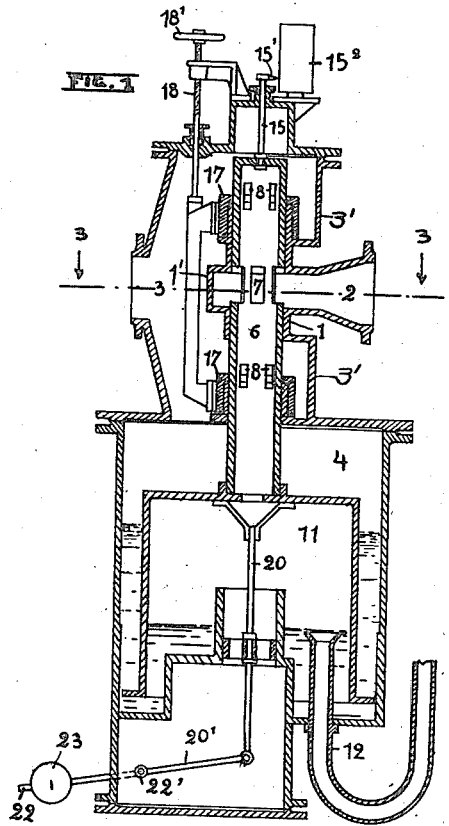
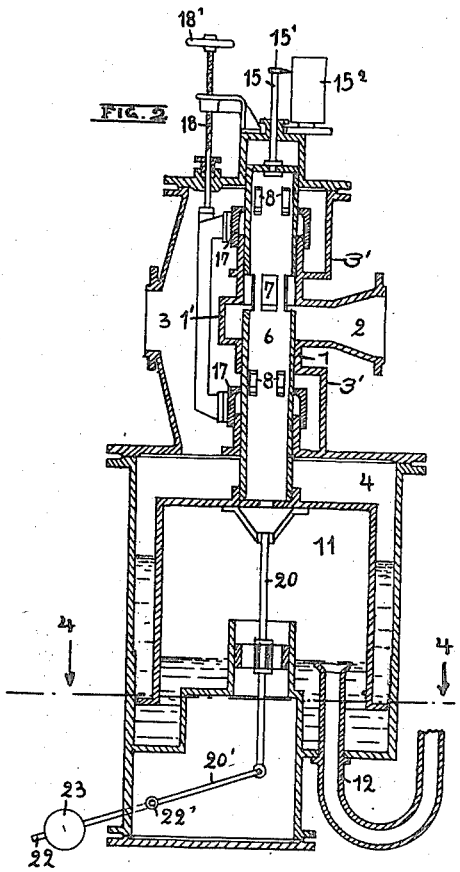
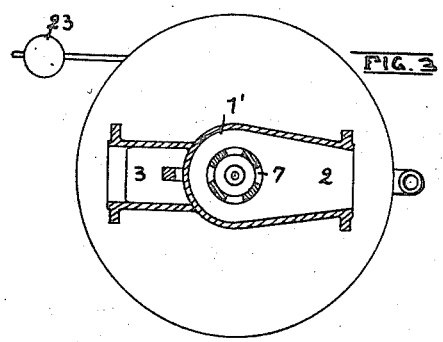
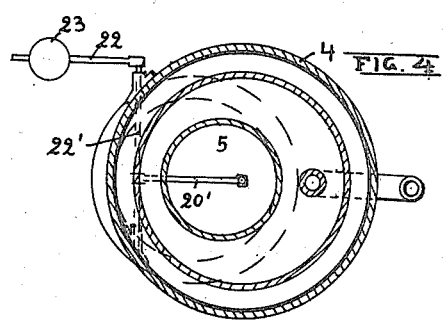
Witnesses
Inventor
Hendrik M. Liese
By Christian H. Sonneveldt
Attorney

UNITED STATES PATENT OFFICE.

HENDRIK MATHŸS LIESE, OF HAMBURG, GERMANY.

DEVICE FOR MEASURING AND FOR REGULATING THE FLOW OF FLUIDS—LIQUID OR GASEOUS.

1,177,193.

Specification of Letters Patent.

Patented Mar. 28, 1916.

Application filed December 8, 1911. Serial No. 664,691.

*To all whom it may concern:*

Be it known that I, HENDRIK MATHŸS LIESE, residing at Hamburg, Germany, have invented certain new and useful Improvements in Devices for Measuring and for Regulating the Flow of Fluids—Liquid or Gaseous, of which the following is a specification.

My present invention relates to devices for measuring, and for regulating the flow of fluids—liquid or gaseous,—and its object is to provide a device of that character, operating automatically by means of a valve controlled by a constant difference of pressure of the fluid between the valve's inlet side and outlet side; and also to provide such a device improved in other respects hereinafter appearing. This object is attained by, and my invention finds a preferable embodiment in, the structure hereinafter described and illustrated by the accompanying drawings, in which:

Figure 1, is a central longitudinal section of such structure; Fig. 2, is a like view showing certain parts in another position; Fig. 3, is a transverse section of the structure on a plane corresponding with line 3—3 of Fig. 1; Fig. 4, is a like view on a plane corresponding with line 4—4 of Fig. 2.

My invention is based on the principle that the velocity of the flow of a fluid passing through an opening is dependent on the difference of pressure upon such fluid at the inlet and the outlet of said opening, the velocity of the fluid remaining constant, independently of the size of the opening, if the said difference of pressure remains the same. Therefore, as the quantity of the fluid is equal to the product of the velocity and the area of the opening, the said area will be a measure of the quantity of the fluid, if the difference of the pressure and therefore the velocity remain constant.

Therefore, in order to measure the quantity of the fluid, my invention consists in providing a measuring passage in the conduit through which the fluid flows, means controlled by the difference of pressure at the inlet and outlet sides of the passage for increasing and reducing the passage so as to maintain the difference of pressure constant, and means for determining the area of the said passage.

In the form of my invention shown in Figs. 1 and 2 my improved apparatus consists of a vessel 4 which is provided at its top with a tubular extension 1 formed substantially at its middle with an annular portion 1', and an inlet pipe 2, and communicating at its top as well as below the annular portion 1' with annular enlargements 3' of an outlet chamber 3. Within the vessel 4 a bell 11 is located, which is adapted to float in a suitable sealing liquid, and which has secured to its top a tubular valve 6. The said valve is closed at its top, and communicates with the annular portion 1' and the inlet pipe 2 through slits 7, and with the annular portions 3', 3' and the outlet chamber 3 through upper and lower slits 8. Furthermore the tubular valve 6 communicates at its bottom with the inner part of the bell, while the outlet chamber 3 communicates with the vessel 4 above the bell 11, so that the pressure within the tubular valve acts on the bell from below, while the pressure within the exhaust 3 acts on the bell from above.

As is shown in the drawings, the bell is immersed with its lower part in a suitable sealing liquid, by means of which the inner part of the bell is separated from the upper part of the vessel 4, the level of the liquid being controlled by an overflow 12. Such sealing liquid may be provided by the water of condensation where the apparatus is used in connection with saturated steam. Where the fluid to be measured is liquid mercury may be employed as a sealing liquid, and a solution containing chlorid of calcium for gases, oil for superheated vapors, steam, etc. The differential pressure acting on the bell is in equilibrium with the active weight of the bell and the parts connected therewith. A part of the active weight can be balanced by means of a weight 23 provided on a rocking lever 22 connected with the bell by a shaft 22', an arm 20', and a vertical rod 20.

To the top end of the valve 6 a rod 15 is secured, which is provided at its upper end with a pencil 15' for recording the position of the valve on a rotary drum $15^2$.

In the operation of the apparatus the fluid to be measured, for example saturated steam, is admitted through the inlet pipe 2 and the slits 7 to the inner part of the slide valve 6. The pressure of the fluid within the valve 6 is transmitted to the inner part of the bell 11, so that the latter is lifted, and the slits 8 establish communication between the inlet pipe 2 and the outlet 3. When passing through the slits 8, the pressure of the fluid is reduced, so that the pressure on the upper side of the bell 11 is below that acting on the lower side. Therefore the bell and slide valve 6 will set themselves in a definite position in which equilibrium is established between the weight of the bell and the parts connected therewith, and the differential fluid pressure acting on the bell, said differential pressure corresponding to a definite area of the slits 8. If now the amount of fluid flowing through the slits 8 is increased, the fall of pressure of the fluid flowing through the slits 8 is increased. Thereby the bell 11 is lifted, and the area of the slits 8 increased, until equilibrium is reëstablished, and, as the weight of the bell and the parts connected therewith has not been changed, the loss of pressure and the velocity of the fluid flowing through the slits are the same as before. As the volume of the fluid flowing through the slits is equal to the product of the velocity of the fluid and the area of the slits, the area of the slits and therefore the vertical adjustment of the bell 11 is a measure of the volume of fluid flowing through the apparatus, which volume is recorded on the drum $15^2$. If the amount of fluid flowing through the apparatus is reduced, the operation of the apparatus is the reverse, and the slide valve is lowered.

As shown in the figures the slits 7 are exactly at the middle between the upper and lower slits 8. Therefore the fall of pressure of the fluid flowing from the slits 7 to the upper and lower slits 8 is the same, so that the conditions of pressure of the two branches of the flowing fluid are exactly alike in the upper and lower slits 8, which is an important feature, as will be understood from the following: If for example the lower slits 8 were nearer the upper slits, a larger part of the fluid would flow through the lower slits than through the upper slits, and as the area of the slits is the same the fall of pressure is different in both slits. From this it will clearly be understood, that correct measuring is not possible, because the fall of pressure controls the position of the bell 11 and the indications of the drum $15^2$, and correct measuring is possible only, if the fall of pressure is the same in both slits.

In my improved apparatus means are provided, whereby the apparatus can be used for allowing a definite and constant amount of fluid to pass through a conduit. For this purpose means are provided for throttling the fluid flowing through the apparatus when the amount of fluid is above the desired amount, which means are likewise controlled by the bell 11 and the slits 8. In the example shown in Figs. 1 to 4 such throttling means are provided by the inlet slits 7 and the upper wall of the annular chamber 1'. If it is desired to use the apparatus in this manner, the bell 11 and the valve 6 are first raised into the position shown in Fig. 2, in which the measuring slits 8 have a constant area, and the slits 7 can be throttled. For this purpose a tubular slide 17 is provided which consists of an upper and a lower section and incloses the pipe 1 below the upper and lower slits 8. The slide is connected with a vertical rod 18 which is screw-threaded at its upper end and carries an internally screw-threaded hand wheel 18' by means of which the rod and the slide 17 can be set in vertical direction. If the slide 17 is shifted upward and fluid is admitted through the inlet 2, the bell sets itself in a higher position than before, because the fall of pressure within the slits which must be in equilibrium with the constant weight of the bell and connected parts which is the same as before, and the slide 17 obstructs the lower part of the slits. It will therefore be understood, that the slide valve 6 sets itself in the position shown in Fig. 2, in which the slits 8 are partly covered by the upper walls of the annular portions 3' so as to have a constant area. If now the amount of fluid flowing through the apparatus is increased, the loss in pressure caused by the slits 8 is increased. Therefore also the differential pressure acting on the bell 11 is increased, so that the bell, the weight of which is not changed, is lifted. Thereby the fluid flowing through the slits 7 is throttled in a higher degree than before, until only so much fluid is allowed to pass through the apparatus that the same differential pressure is produced in the slits 8 as before, or in other words, as the area of the slits 8 is the same as before, until the normal amount of fluid flows through the apparatus. If on the other hand the amount of fluid flowing through the apparatus is below the normal, the velocity of the fluid flowing through the slits 8 and the fall of pressure are reduced, so that the bell 11 and the valve 6 move downward. Thereby the open area of the slits 7 is increased, until the normal amount of fluid flows through the apparatus. It will therefore be understood, that both sets of slits 7 and 8 coöperate to maintain a uniform flow of fluid, the slits 8 causing a displacement of the bell 11 and valve 6, if the quantity of the fluid is above or below the normal, and the slits 7 being obstructed more or less until the normal flow is reëstablished.

I claim herein as my invention:

1. In a valve of the class described, a fluid conduit having a measuring passage of variable area and a throttle passage of variable area, a tubular slide valve closed at one end and having openings of different sizes therein for communication with the fluid conduit, controlling the area of the measuring passage, means under control by the differential fluid pressure on opposite sides of the measuring passage to set the valve in such a way as to maintain the differential pressure constant and vary the area of the throttle passage, and means to measure the area of the measuring passage.

2. In an apparatus of the class described, a fluid conduit having a measuring passage of variable area and a throttle passage of variable area communicating with the fluid conduit, a tubular slide valve controlling the area of the measuring passage and having openings therein for registration with the fluid conduit for admitting fluid within the valve, a movable member connected with said valve and tending to move with constant force in one direction and exposed with opposite sides to the fluid pressure prevailing on opposite sides of the measuring passage and in equilibrium with the said pressures and adapted to set said valve so as to maintain the difference of pressure on opposite sides of the measuring passage constant and to vary the area of the throttle passage, and means to measure the area of the measuring passage.

3. In an apparatus of the class described, a fluid conduit having a throttle and a measuring passage of variable area, a valve having openings therein for registration with the fluid conduit controlling the area of the measuring passage, a vertically movable bell connected with said valve and exposed with its upper and lower sides to the fluid pressure prevailing on opposite sides of the measuring passage and in equilibrium with the said pressures and adapted to set said valve so as to maintain the difference of pressure on opposite sides of the measuring passage constant, and to vary the area of the throttle passage and means to measure the area of the measuring passage.

4. In an apparatus of the class described, a fluid conduit branched into two sections and having at least one measuring passage in each of said branches, the dimensions of said sections being such that the resistance of the fluid flowing through the same is alike in both sections, means controlled by the differential fluid pressure at the inlet and outlet sides of the measuring passages to vary the area of the measuring passages so as to maintain the differential pressure constant, and means to measure the area of the measuring passages.

5. In an apparatus of the class described, a fluid conduit, a movable member tending to move with constant force in one direction and comprising a tubular slide valve closed at its end and having at least one opening and at least one measuring passage and forming a part of the conduit, said tubular valve and conduit communicating at opposite sides of the measuring passage with opposite sides of the movable member so that the differential fluid pressure at opposite sides of the measuring passage tends to balance the force acting on the movable member, the area of the measuring passage being adapted to be varied by the movements of the movable member, and means to measure the open area of the measuring passage.

6. In an apparatus of the class described, a fluid conduit, a movable member tending to move with constant force in one direction and comprising a tubular slide valve closed at its end and having at least one opening and at least two measuring passages disposed at opposite sides of and equal distances away from said opening and forming a part of the conduit, said tubular valve and conduit communicating at opposite sides of the measuring passages with opposite sides of the movable member so that the differential fluid pressure at opposite sides of the measuring passages tends to balance the force acting on the movable member, the area of the measuring passages being adapted to be varied by the movements of the movable member, and means to measure the open area of the measuring passage.

7. In an apparatus of the class described, a fluid conduit having a measuring passage of variable area and a throttle passage of variable area, and means under control by the differential fluid pressure on opposite sides of the measuring passage to vary the area of the throttle passage so as to maintain the differential pressure on opposite sides of the measuring passage constant.

8. In an apparatus of the class described, a fluid conduit having a measuring passage of variable area and a throttle passage of variable area, and a valve under control by the differential fluid pressure on opposite sides of the measuring passage to vary the area of the throttle passage so as to maintain the differential pressure on opposite sides of the measuring passage constant.

9. In an apparatus of the class described, a fluid conduit having a measuring passage of variable area and a throttle passage of variable area, a movable member tending to move with constant force in one direction and under control by the differential fluid pressure on opposite sides of the measuring passage and in equilibrium therewith, and a valve controlled by the movable member and adapted to vary the area of the throttle passage so as to maintain the differential pressure on opposite sides of the measuring passage constant.

10. In an apparatus of the class described, a fluid conduit, and a movable member tending to move with constant force in one direction and comprising a tubular slide valve closed at its end and having at least one throttle passage of variable area and at least one measuring passage of variable area and forming a part of the conduit, said tubular valve and conduit communicating at opposite sides of the measuring passage with opposite sides of the movable member so that the differential fluid pressure at opposite sides of the measuring passage tends to balance the force acting on the movable member, the area of the measuring passage being adapted to be varied by the movements of the movable member.

In testimony whereof I have affixed my signature in presence of two witnesses.

HENDRIK MATHŸS LIESE.

Witnesses:
ERNEST H. L. MUMMENHOFF,
FRANCIS R. STEWART.